United States Patent [19]
Oyama et al.

[11] Patent Number: 6,126,285
[45] Date of Patent: Oct. 3, 2000

[54] TRIAL LENS

[75] Inventors: Hiroyuki Oyama; Yuji Goto, both of Aichi, Japan

[73] Assignee: Menicon Co., Ltd., Nagoya, Japan

[21] Appl. No.: 09/285,759

[22] Filed: Apr. 5, 1999

[30] Foreign Application Priority Data

Apr. 8, 1998 [JP] Japan ................................. 10-096045

[51] Int. Cl.[7] .................................................... G02C 7/04
[52] U.S. Cl. ...................... 351/160 R; 351/177; 351/219
[58] Field of Search .......................... 351/160 R, 160 H, 351/161, 162, 177, 219

[56] References Cited

U.S. PATENT DOCUMENTS

| | | | |
|---|---|---|---|
| 5,406,341 | 4/1995 | Blum et al. | 351/177 |
| 5,598,234 | 1/1997 | Blum et al. | 351/177 |

FOREIGN PATENT DOCUMENTS

| | | |
|---|---|---|
| 0 346 032 | 12/1989 | European Pat. Off. . |
| 0 618 474 | 10/1994 | European Pat. Off. . |
| WO 95/25981 | 9/1995 | WIPO . |
| WO 97/12272 | 4/1997 | WIPO . |
| WO 97/48006 | 12/1997 | WIPO . |

*Primary Examiner*—Scott J. Sugarman
*Attorney, Agent, or Firm*—Oblon, Spivak, McClelland, Maier & Neustadt, P.C.

[57] ABSTRACT

A trial lens has a lens surface provided with an index. A stable position of the trial lens on a cornea of a wearer thereof is measured by the use of the index. The position of an optical center of a contact lens to be worn by the wearer can be determined based on the measurement done with the index of the trial lens in order to set the position of the optical center of the contact lens so as to fit contact lenses on individual wearers.

17 Claims, 4 Drawing Sheets

TRIAL LENS

BACKGROUND OF THE INVENTION

1. Field of the Invention

The present invention relates to a trial lens which is used to determine an optical center of a non-single spherical surface type contact lens, such as a multifocal lens having a plurality of visual correcting zones with different refractive powers set therein and a toric lens with a degree of lens power for astigmatism correction added thereto, and also relates to related technology.

2. Discussion of Background

Contact lenses for visual correction are well known. The present invention provides a non-single spherical surface type contact lens with a lens surface in an optical area including a plurality of spherical surfaces or a toric surface, such as: (1) a multifocal lens having a plurality of visual correcting zones with different degrees of spherical lens power; (2) a toric lens with a degree of cylindrical lens power set therein; and (3) a toric-multifocal lens with a degree of spherical lens power having multifocal and a degree of cylindrical lens power combined therein. Application of a contact lens to an eye of a person who has degraded accommodation in eye refractive power due to presbyopia and so on, or has ametropia due to astigmatism, has been considered.

In such a non-single spherical surface type contact lens, it is crucial to position an optical area with respect to a pupil in comparison with a single spherical surface type contact lens which has both lens surfaces substantially formed in a single spherical surface to be used for visual correction of spherical ametropia due to myopia or hyperopia. When a non-single spherical surface type contact lens has an optical area which deviates from an optical center of a pupil of the wearer of the contact lens and the deviation is by a great deviation quantity, an aberration could occur causing the contact lens to fail to exhibit a proper visual correcting ability, and degrading clearness in visibility. When a contact lens has an optical center set at a uniform relative position with respect to a geometric center thereof, the contact lens has, in some cases, a deviation quantity of the optical center thereof with respect to the optical center of a pupil increased to fail to exhibit a satisfactory visual correcting function since the stable position of a contact lens on a pupil varies with individuals.

In order to cope with this problem, it has been proposed that an optometer be used to superimpose a meridian distance measuring pattern over an image with the state of wearing a contact lens being photographed so as to compose an inspection image, so that the stable position of the contact lens on the cornea is measured by the use of the inspection image displayed on a monitor, and the position of the optical center on the contact lens is determined based on the measurement so as to favorably position the optical center with respect to a pupil position, which is disclosed in JP-A-646998 for instance.

Such a position determination method requires an expensive measuring device, such as a camera, a monitor, an image processing processor and so on, creating a problem in cost and because the measuring device is difficult to operate. There is a possibility that the measuring accuracy degrades because of misalignment in superimposing a meridian distance measuring pattern over an image when the wearer is photographed in the state of wearing the contact lens.

OBJECTS OF THE INVENTION

The present invention has been devised considering such circumstances. It is an object of the present invention to provide a novel trial lens for determining an optical center on a non-single spherical surface type contact lens, capable of measuring a position of the contact lens on a cornea or a pupil position on the contact lens worn by a user easily and with high accuracy, without using an expensive measuring device.

It is another object of the present invention to provide a method capable of measuring a stable position of a non-single spherical surface type contact lens on a cornea easily and with high accuracy, without using an expensive measuring device.

It is a further object of the present invention to provide a novel method capable of determining an optical center of a non-single spherical surface type contact lens easily and with high accuracy, without using an expensive measuring device.

SUMMARY OF THE INVENTION

In order to attain the above-stated objects, the present invention provides a contact lens type trial lens for determining a relative position of an optical center of a contact lens with respect to a geometric center of the contact lens, the contact lens having a lens surface in an optical area formed so as to include a plurality of spherical surfaces or a toric surface, comprising a lens surface in a central portion which substantially corresponds to an optical area of a contact lens, and an index provided on the lens surface of the central portion to identify a certain point on the lens surface of the central portion.

In the trial lens according to the present invention, the index provided on the lens surface of the central portion can be utilized to promptly determine the position of a certain point on the lens surface with a pair of values, such as coordinate values. By having a wearer wear the trial lens, a pupil position on the lens surface of the trial lens can be measured by the use of the index. By setting the position of the optical center of a contact lens based on the measured values, the contact lens can be favorably provided so that the contact lens has the optical center matched with the pupil position of the wearer.

When an eye care practitioner has a subject wear the trial lens according to the present invention, the practitioner can examine the trial lens with his/her naked eye, or through a magnifying glass, or a slit lamp, if necessary, to measure the position of a contact lens on the wearer's cornea. The measurement for determining the position of the optical center of the contact lens can be carried out easily and promptly, without using an expensive measuring device, such as a camera, a monitor, an image processing processor, and so on.

The contact lens to which the present invention applies includes a multifocal lens, a toric lens (astigmatic lens), a toric-multifocal lens, and similar. There is no limitation on the specific structure of the optical area. Specifically, the present invention can apply to, for instance, a multifocal lens with a plurality of concentric visual correcting zones as disclosed in JP-A-59208524 or JP-A-2217818, a multifocal lens with a plurality of visual correcting zones divided into upper and lower sections in belt patterns as disclosed in JP-A-6395415 or JP-A-1319729, and a toric-multifocal lens as disclosed in JP-A-926558. The trial lens, according to the present invention, can be favorably adopted to determine the position of the optical center of the above-listed examples of contact lenses to improve the determining accuracy of the optical center of these contact lenses based on measured values. There is no limitation on the material of the contact lens to which the present invention applies. The present invention may apply, not only to a soft contact lens, but also to a hard contact lens.

There is no limitation on the material to be used for the trial lens. Any known material for contact lenses can be adopted to prepare the trial lens. The trial lens may be of both a soft contact lens type and a hard contact lens type. In order to obtain an excellent measuring accuracy and consequently, to obtain a determining accuracy of the optical center of a contact lens to be worn, it is preferable that the trial lens is of the same type and is made of the same material as the contact lens. The index, which is provided on the central portion substantially corresponding to the optical area of the contact lens, is not necessarily required to cover the entire surface of the optical area of the contact lens since a deviation quantity of the contact lens on a cornea generally lies within a limited range. For example, the index may be provided on only the lens surface in the central portion which corresponds to a central zone of the optical area of the contact lens. If the deviation of the position of a cornea on the contact lens is roughly known in advance, the position of the index may deviate from the center of the trial lens accordingly.

It is sufficient for the index to provide a reference element to identify the position of a certain point which exists on the trial lens. Although the index can have, not only any form, but also any reference point, it is preferable that the index is represented by coordinates, wherein a relative position of the trial lens with respect to a geometric center of the trial lens is identified with respect to a known point, such as the origin. More specifically, a reference element, such as orthogonal axes or radial axes with a scale representing orthogonal coordinates, oblique coordinates or polar coordinates, a lattice-shaped mesh scale, and a dotted mark, can be favorably adopted as the index. More preferably, the geometric center or the optical center of the trial lens, which corresponds to the geometric center or the optical center of a contact lens, is adopted as the origin of these coordinates, simplifying the calculation required for determining the optical center of the contact lens based on measured values.

The index may be anything visible from outside. The index can be provided by various techniques, such as carving a lens surface by a laser, cutting, drilling or grind-etching, and printing with dye. It is preferable that the index is colored, for instance, in transparent fashion. Application of such a colored and transparent index can not only reduce or prevent adverse effect to measuring conditions, such as a subject's visibility, but can also allow a fine index or many indexes to be provided on a lens surface over a wide range. Thus, recognition by an eye care practitioner and consequently, operating performance in measurement and measuring accuracy, can be favorably improved. When the index is carved into a lens surface, it is preferable that the index is provided on a convex side of the lens, which can reduce or prevent adverse effect to a cornea or a wearer feeling the index while wearing the trial lens.

The trial lens, according to the present invention, is preferably provided with a stabilizer for positioning the trial lens on a cornea in a circumferential direction of the trial lens. The provision of the stabilizer can position the trial lens on a cornea in the circumferential direction to further improve measuring accuracy, as well as to further facilitate measurement of a pupil position with the use of the index. The stabilizer can adopt various conventional structures, such as: (1) a prism ballast structure with a gravity center deviated downwardly; (2) a dynamic stabilization structure with upper and lower peripheral zones of a lens surface thinned in a slanted fashion, and (3) a truncation structure with a lower end of a lens cut substantially linearly in a horizontal direction. The stabilizer, which is preferably adopted, is the same as the stabilizer which is provided on a contact lens to be worn. Thus, a determining accuracy of the optical center of the contact lens, based on a measured value, can be further improved.

It is preferable that the trial lens, according to the present invention, has a lens concave side formed in a substantially spherical shape to match with a surface profile of a cornea. By such arrangement, the trial lens can offer the wearer an improved feeling when worn. Since a contact lens has a concave side formed in a substantially spherical surface to match with a surface profile of a cornea in many cases, the provision of a substantially spherical surface on the concave side of the trial lens can favorably bring the stable position of the trial lens much closer to the stable position of a contact lens to be worn, further improving measuring accuracy and consequently, determining accuracy of the center of the contact lens.

It is preferable that the trial lens, according to the present invention, has a lens convex side formed so as to include a plurality of spherical surfaces or a toric surface. Since such arrangement can bring the trial lens much closer, in terms of shape, to the contact lens to be actually worn, the arrangement can favorably bring the stable position of the trial lens much closer to the stable position of the contact lens to be worn, further improving measuring accuracy and consequently, determining accuracy of the center of the contact lens.

In order to solve the above-described problems, the present invention also provides a method for measuring a stable position of a contact lens on a cornea of a wearer, the contact lens having a lens surface in an optical area formed so as to include a plurality of spherical surfaces or a toric surface, comprising using the trial lens according to the present invention, putting the trial lens in a stable position on a cornea of a wearer, and measuring a relative position of the trial lens with respect to a pupil in the cornea by the index provided on the trial lens to indirectly identify a stable position of the contact lens.

In accordance with the method of the present invention, the trial lens is regarded as a contact lens and the stable position of the trial lens on the cornea is measured by the use of the index provided on the trial lens, indirectly identifying the stable position of the contact lens on the cornea. Since the index on the trial lens is provided on the lens surface of the central portion of the trial lens which substantially corresponds to the optical area of the contact lens, the stable position of the trial lens on the cornea and consequently, the stable position of the contact lens on the cornea, can be easily measured by the use of the index, without using an expensive measuring device.

In order to solve the problems, the present invention also provides a method for determining a relative position of an optical center of a contact lens with respect to a geometric center of the contact lens, the contact lens having a lens surface in an optical area formed so as to include a polarity of spherical surfaces or a toric surface, comprising using the trial lens according to the present invention, putting the trial lens on a cornea of a wearer, measuring a relative position of a geometric center of the trial lens with respect to a pupil in the cornea by the index provided on the trial lens, and determining a relative position of an optical center of a contact lens with respect to a geometric center based on a measured value.

In accordance with the method of the present invention, the position of the optical center of a contact lens to be worn can be easily determined, depending on wearers, based on the measurement of the pupil position on the trial lens by the use of the index provided on the trial lens. The position of the optical center of the contact lens can be determined promptly and simply, without using an expensive measuring device, such as a camera, a monitor, and so on.

When the position of the optical center of a contact lens is determined based on a measured value obtained by the trial lens, it is preferable, in general, that the optical center is determined so as to substantially correspond to a pupil position of a wearer during the wearing of the contact lens. However, this is not indispensable. The optical center may deviate from the pupil position when measured, taking a wearer's daily life, such as a job, into account. Specifically, it is effective to determine the optical center, taking into account that, if a wearer is engaged in a job requiring reading and writing of characters most of the time, it is preferable to downwardly offset the center of a visual correcting zone for near vision toward the nose of the wearer, and that, if a wearer is engaged in a job normally requiring distance vision, it is preferable to set a visual correcting zone for distance vision so as to widely extend around the optical center. When the relative position of the geometrical center of the trial lens, with respect to the pupil of the wearer, is measured by the use of the index provided on the trial lens in accordance with the method of the present invention, the measurement may be carried out with a naked eye or through a magnifying glass, or the measurement may be carried out by the use of a picture or an image with the trial lens worn by the wearer being photographed.

In determination of the position of the optical center of a contact lens according to the present invention, the pupil diameter of a wearer is also measured by the use of the index when measuring the relative position of the geometric center of the trial lens, with respect to the pupil of the wearer, by the use of the index on the trial lens. The lens surface profile, in an optical area of the contact lens, may be determined based on a measured value indicative of the pupil diameter. Such a method can simultaneously measure the pupil diameter of the wearer as well, without the need for a special operation. Based on the measured value, not only the position of the optical center of the contact lens, but also the size and the position of respective visual correcting zones in the optical area, can be individually set or selected, depending on the position of the wearer's pupil. Thus, the contact lens can be matched with the wearer at an advanced level without any significant deterioration in operating performance in measurement. As a result, the contact lens can exhibit its visual correcting ability as its function in a stable and effective way. In accordance with this method, the measurement can be carried out easily under natural light outdoors, or in the job environment of the wearer. The optical center, the size, and the position of the visual correcting zones can be easily set on the contact lens so as to match with the wearer's daily life.

DETAILED DESCRIPTION OF THE PREFERRED EMBODIMENTS

The present invention will be described in more detail, referring to the embodiments according to the present invention shown in the accompanying drawing figures.

Figure 1:
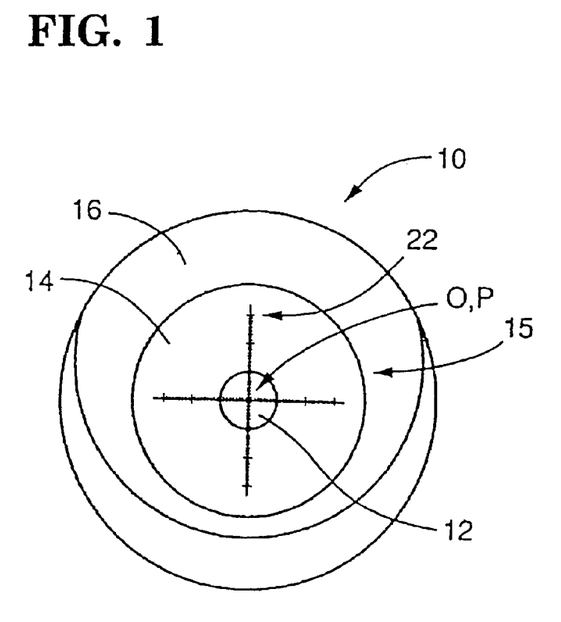
FIG. 1 is a front view of the trial lens according to a first embodiment of the present invention.
Figure 2:
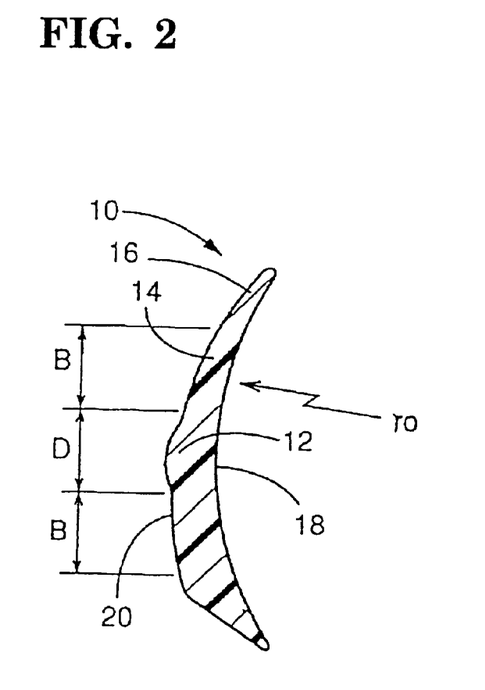
FIG. 2 is a vertical cross-sectional view of the trial lens of FIG. 1.

In FIGS. 1 and 2, the trial lens 10, according to a first embodiment of the present invention, is shown. The trial lens 10 is suitably used for designing a presbyopic contact lens. The trial lens 10 is made of the same material as a targeted presbyopic contact lens, and has substantially the same profile and the same optical characteristics as the targeted contact lens.

More specifically, the trial lens 10, according to the first embodiment, has a central portion formed with a circular visual correcting zone 12 for near vision having a diameter D. The trial lens also has an annular-shaped visual correcting zone 14 for distance vision formed so as to surround the visual correcting zone 12 for near vision. The visual correcting zone 12 for near vision and the visual correcting zone 14 for distance vision form an optical area 15 that exhibits a visual correcting function. Outside an outer circumference of the visual correcting zone 14 for distance vision, an annular peripheral portion 16 is provided as a non-optical area that does not exhibit an effective visual correcting function. In this embodiment, the visual correcting zone 12 for near vision and the visual correcting zone 14 for distance vision are concentrically formed about a single optical center O. The optical center O is coincident with a geometric center P as the center of a lens contour.

In the trial lens 10, which has a structure matched to a presbyopic contact lens for both near and distance vision, a wearer normally uses both the visual correcting zone 12 for near vision, and the visual correcting zone 14 for distance vision, simultaneously, to observe a visible object as in a normal presbyopic contact lens. The wearer can distinguish an image clearly visible by either one of the visual correcting zones 12 and 14 based on his or her cerebral activities to recognize the visible object.

The trial lens 10 has a rear surface 18 formed in the substantially same shape as the rear surface of a targeted contact lens, or an concave shape matched to the surface shape of a cornea, throughout the entire surface of the rear surface. Thus, the rear surface is formed in a spherical shape (base curve) having a radius of curvature r0 close to that of the cornea of an eye on which the targeted contact lens is applied. The rear surface 18 has an outer circumferential portion formed with a bevel, if necessary, as in the targeted contact lens.

The trial lens 10 has a front surface 20, not only formed in a convex shape in the visual correcting zone 12 for near vision so as to provide corrected sight effective for near vision, but also formed in a convex shape in the visual correcting zone 14 for distance vision so as to provide corrected sight effective for distance vision. In order that the respective visual correcting zones 12 and 14 can exhibit substantially the same refractive powers as the targeted contact lens, it is preferable that the surface shapes of the respective visual correcting zones be as close as possible to those of the targeted contact lens. The front surface 20 is off centered with respect to the rear surface 18 to provide a prism ballast structure with a center of gravity, which is downwardly deviated, and the front surface has a lower part of an outer peripheral portion formed with a slab taken off to reduce a wall thickness thereof, allowing the trial lens to be positioned on the cornea in a circumferential direction when wearing the trial lens. It is preferable that the prism ballast structure and the slab, which has been taken off, are the same as those of the targeted contact lens.

The front surface 20 of the trial lens 10 has an index 22 provided thereon so as to stretch in the visual correcting zone 12 for near vision and the visual correcting zone 14 for distance vision forming the optical area 15. The index 22 is one that a practitioner can recognize with a naked eye or through a magnifying glass when the trial lens is worn by a subject (i.e., the person who is going to wear the contact lenses). Although, for instance, the index 22 may be preferably represented by dyed marks formed by, for example, printing, the index 22 may be marked by a laser or a cutter. In terms of easy recognition by the eye care practitioner, the index 22 is preferably colored. In this case, it is preferable that the index 22 is colored in transparent fashion to prevent the subject from having significantly degraded visibility.

The index 22, according to this embodiment, is represented by orthogonal coordinates on an X-axis which perpendicularly intersects a Y-axis. The X-axis and the Y-axis are formed with a scale. The origin O' of the orthogonal coordinates is coincident with the geometric center P and the optical center O. When the trial lens is positioned by a prism ballast structure the X-axis direction is a horizontal direction and the Y-axis direction is a vertical direction.

It is preferable that each of the X-axis, the Y-axis, and the scale forming the index 22 is formed in a line width of 0.05 mm–0.50 mm so as to be visible through a magnifying glass and so on, if necessary, and to ensure a sufficient measuring accuracy. The length and the position of the X-axis and the Y-axis forming the index 22 are determined so that the pupil of an assumed subject wearing the trial lens 10 lies in an area to be capable of identifying a position in the orthogonal coordinates (X, Y), when he or she wears the trial lens 10. In general, it is preferable that each of the X-axis and the Y-axis has a length of 1 mm–13 mm with the optical center O substantially located at the center thereof It is preferable that the graduations of the scale on the X-axis and the Y-axis be provided at intervals of 0.05 mm–1.00 mm so as to be visible to a naked eye, through a magnifying glass, and so on, to ensure a sufficient measuring accuracy.

The trial lens 10 thus formed, which is worn by a person (the subject) who is going to wear a contact lens, can measure a stable position of the contact lens on a cornea with the contact lens applied thereon. The optical position and other factors of the contact lens can be found based on a measured value to attain optimum design matched to individual wearers. Now, a method for fitting a contact lens by using the trial lens 10, according to the present invention, will be described.

Figure 3:
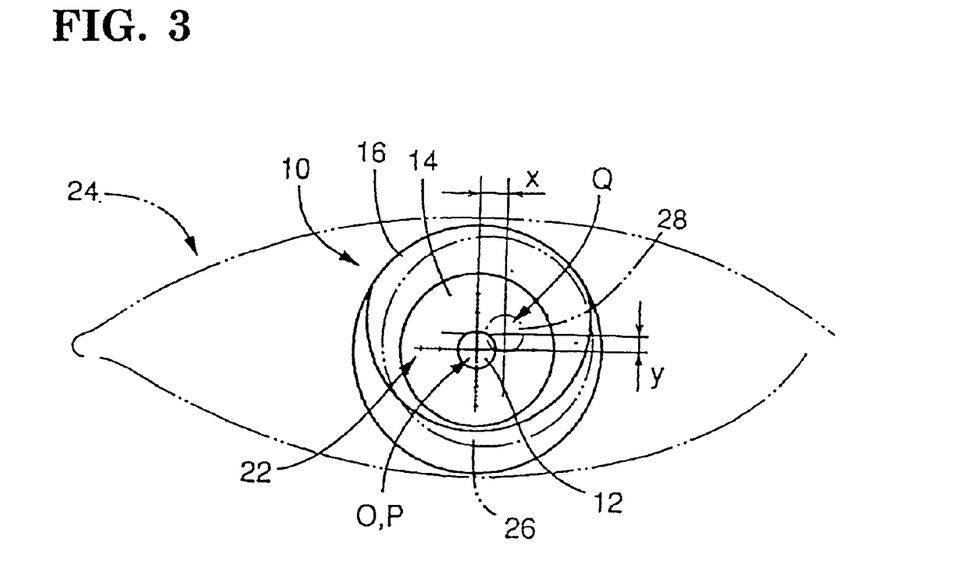
FIG. 3 is a schematic view to show how the trial lens of FIG. 1 is worn.

First, a trial lens 10 that has a shape, as close as possible to a contact lens to be worn, is selected based on data, such as sight and the shape of a cornea. This data has been found in a pre-check of a person (subject) who is going to wear the contact lens. As shown in FIG. 3, the trial lens 10 is applied to an eye 24 of the subject and is located at a stable position on the cornea 26. At that time, the subject recognizes a prespecified object at a suitable distance and a suitable position, for instance, to stabilize the position of the trial lens 10 on the cornea 26. Under the circumstances, an eye care practitioner measures the position of the pupil 28 on the trial lens 10 through a magnifying glass or other suitable instrument, if necessary. This measurement is carried out by finding coordinate values x and y indicative of the center Q of the pupil 28 in the orthogonal coordinates (X, Y) by using the index 22 of the trial lens 10 which is located in the stable position. In addition, the diameter d of the pupil 28 (pupil diameter) is also found by the use of the orthogonal coordinates (X, Y). It is preferable that the pupil diameter d is measured with the brightness around the subject controlled to a certain value or under different brightness conditions.

The coordinate values x and y, thus found, represent the center of the pupil 28 of the subject on the contact lens, when the subject wears the contact lens. In this embodiment, the coordinate values x and y directly represent a deviation direction and a deviation quantity from the center Q of the pupil to the geometric center P of the contact lens.

By designing the contact lens in consideration of the measured values (i.e., the coordinate values x and y) and more specifically, by designing the contact lens so as to have its optical center O deviate by (x, y) in the horizontal and vertical directions, respectively, from the geometric center P, the contact lens can be preferably designed so that the optical center O is favorably coincident with the pupil center Q of the wearer. The optical center O of a contact lens is not necessarily required to be coincident with the pupil center Q of a wearer. The optical center O may be properly determined, considering a wearer's daily life or other factors. For example, if a wearer spends a lot of time in reading and writing characters, it is effective that a contact lens is designed so as to have its optical center O downwardly deviated towards the nose of the wearer.

By considering the value d, indicative of the pupil diameter, the shape and the size of an optical area 15 to be set on the contact lens, or the outer diameter size and the shape of each of the visual correcting zones 12, 14 for near vision and for distance vision can be designed so as to be matched to the wearer. Specifically, the contact lens can be designed so as to be further matched to the wearer by designing the shapes and dimensions of both visual correcting zones 12 and 14, so that, for instance, the visual correcting zone 12 for near vision effectively performs the visual correction when the pupil diameter d closes tighter under lighting for reading and the visual correcting zone 14 for distance vision sufficiently covers the entire pupil when the pupil expands under darkness.

The method for fitting a contact lens to a wearer by the use of the trial lens 10, according to the present invention, can measure the stable position of a contact lens on a cornea easily and promptly, without using of an expensive measuring device. By making use of the measurement result, it becomes possible to determine the position of an optical area 15 on a contact lens and consequently, to attain the optimum design of a contact lens so as to be matched to individual wearers, facilitating the design of the contact lens, and improving and stabilizing the visual correcting functions.

Although the present invention has been explained with respect to one embodiment, the present invention is not limited to the above-described embodiment.

Figure 4:
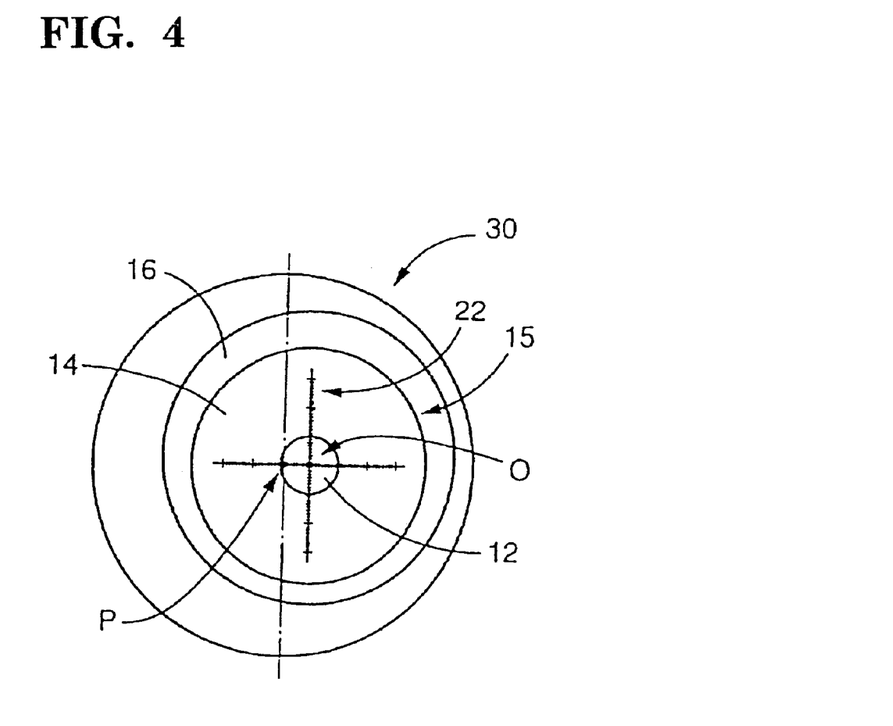
FIG. 4 is a front view of the trial lens according to a second embodiment of the present invention.

Although the trial lens 10, according to the first embodiment, has an optical center O which coincides with the geometric center P, a trial lens may have its optical center O in its optical area 15 deviate with respect to the geometric center P, as with trial lens 30, according to a second embodiment shown in FIG. 4. The trial lens 30, according to the second embodiment, is effective in that it becomes possible to use a trial lens as close as possible to a contact lens to be worn, when the deviation quantity and the deviation direction of the optical center O, with respect to the geometric center P on the contact lens, are roughly found by a pre-check of a wearer. Although the trial lens 30 has the index 22 set so as to have the geometric center P as the origin O' irrespective of the deviation of the optical area 15, the trial lens may have the index 22 set so as to have the optical center O as the origin O' as shown.

Figure 5:
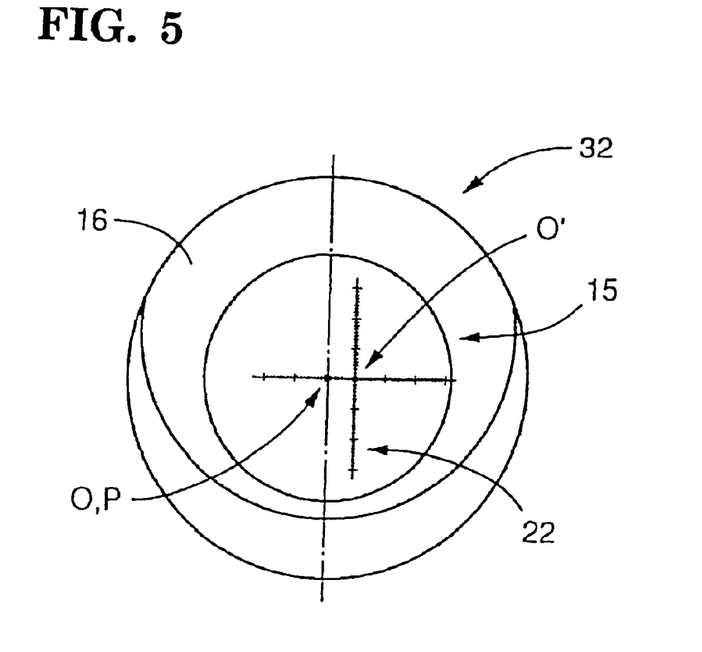
FIG. 5 is a front view of the trial lens according to a third embodiment of the present invention.

It is enough for the index 22 to be set so as to find only the relative deviation quantity and the deviation direction of the origin O' with respect to the geometric center P in order to identify coordinate values (x, y) indicative of a certain point. The index 22 is represented by coordinates wherein the origin O' deviates with respect to both of the optical center O and the geometric center P. which is shown as a third embodiment in FIG. 5. The trial lens 32, with the index 22 set according to the third embodiment, is effective in that only the position of the origin O' deviates so as to correspond to the deviation of the optical center O on a contact lens, in order to effectively ensure a measurable region for the position of the pupil 28, when the deviation quantity and the deviation direction of the optical center O, with respect to the geometric center P on the contact lens, are roughly found by a pre-check of a wearer.

Figure 6:
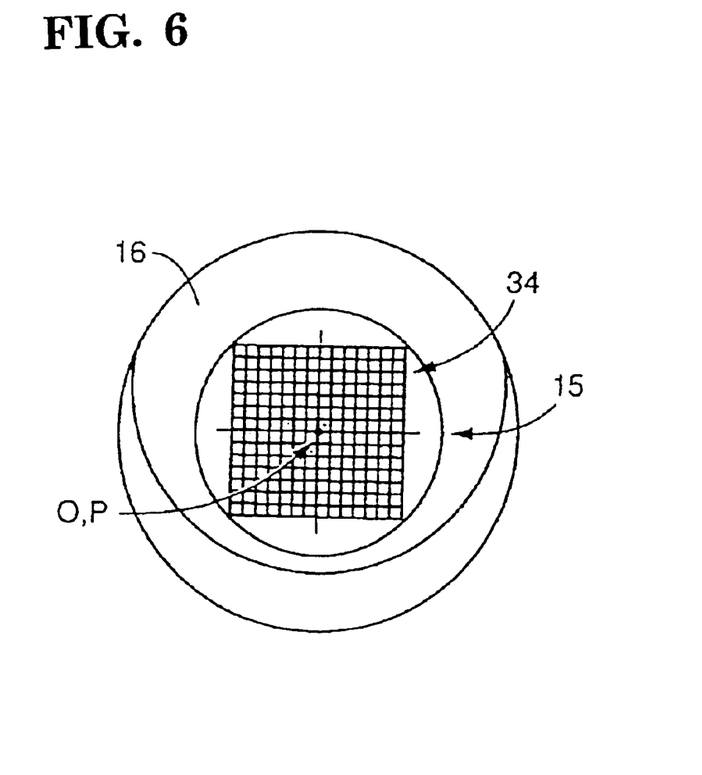
FIG. 6 is a front view of the trial lens according to a fourth embodiment of the present invention.
Figure 7:
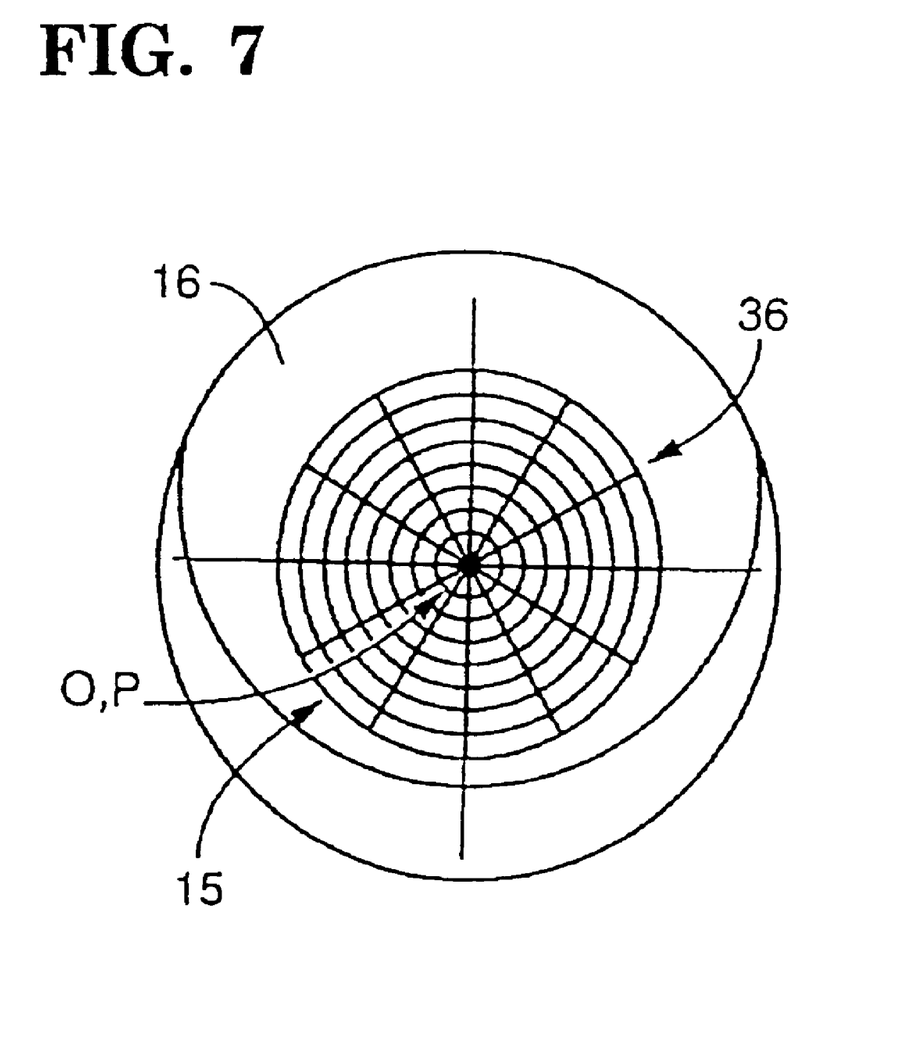
FIG. 7 is a front view of the trial lens according to a fifth embodiment of the present invention.

Although the trial lenses 10, 30, and 32, according to the first through third embodiments, use the index 22 represented by the orthogonal coordinates (X, Y) from the perpendicular X-axis and Y-axis, there is no limitation on the specific form of the index 22, as long as the index 22 can identify a certain position on any of the trial lenses 10, 30, and 32. Specifically, the trial lenses 10, 30, and 32 may have a lattice-shaped index 34 provided thereon, so as to cover an area with a certain point (x, y) identified in the orthogonal coordinates (X, Y), as shown in FIG. 6. The lattice-shaped index 34 can make reading of coordinate values easier, providing a further improvement in measuring accuracy and also prompt measurement. The trial lenses 10, 30, and 32 may use an index 36, represented by polar coordinates, including a plurality of radial lines extending about the origin O' and a plurality of annular lines concentric about the origin O', for example, as shown in FIG. 7. The provision of the index 36 allows the position of a certain point (x, y) to be identified by a distance from the origin O' and an angle from a reference meridian (e.g., a horizontal line) about the origin O'.

In FIGS. 4 through 7 showing the trial lenses according to the second through fifth embodiments, respective elements that are the same as those of the first embodiment are indicated by the same reference numerals as the respective elements of the first embodiment for easy comprehension. It is preferable that the optical area 15 of the trial lenses 32, shown in FIGS. 5 through 7, have a multifocal surface or a toric surface similar to a contact lens to be worn (though not shown in these Figures).

The trial lens, according to the present invention, can measure a stable position of the contact lens to be worn, in the circumferential direction (rotational direction), by the use of the index, when measuring the stable position on a wearer's cornea. The trial lens can favorably set the cylindrical axial direction, or other factors of the toric surface, based on the measurement.

Although the present invention can be put into practice in various modes, which are changes, modifications, or improvements based upon ordinary skill in the art, such changes, modifications, or improvements are considered as falling within the scope of the present invention.

As clearly seen from the explanation, the trial lens, according to the present invention, can easily measure a position on a cornea of the wearer with the trial lens applied thereon, via the index provided on the lens surface. Thus, the measurement to determine the position of the optical center of a contact lens can be carried out easily and promptly, without using an expensive measuring device.

The method for determining a position of a contact lens, according to the present invention, can directly measure a stable position of a contact lens on a cornea of a wearer of the trial lens, instead of a contact lens, and making use of the index on the trial lens. The measurement operation can be made simple and prompt.

The method for determining the optical center of a contact lens, according to the present invention, can determine the position of the optical center of a contact lens, taking into account the stable position the trial lens on a cornea of the wearer. Thus, the optical center of the contact lens can be easily set at an appropriate position so as to match the needs of a wearer, easily optimizing design of the contact lens to individual wearers.

What is claimed is:

1. A contact lens type trial lens to be temporarily worn by a wearer for fitting the wearer with a contact lens by determining a relative position of an optical center of the contact lens with respect to a geometric center of the contact lens, wherein the contact lens has a lens surface in an optical area formed so as to include any one of a plurality of spherical surfaces and a toric surface, said trial lens comprising:

a lens surface in a central portion of said trial lens, wherein said lens surface substantially corresponds to the optical area of the contact lens; and an index any one of formed in and on said lens surface at said central portion so as to be permanent and non-removable, wherein said index provides a reference to identify a certain point on said lens surface of said central portion of said trial lens for fitting the wearer with the contact lens which is optimal according to values measured using said index of said trial lens.

2. The trial lens according to claim 1, wherein said index is represented by coordinates such that a relative position on said trial lens with respect to a geometric center of said trial lens is identified with respect to a known point as an origin.

3. The trial lens according to claim 1, wherein said index is colored in transparent fashion.

4. The trial lens according to claim 1, further comprising a stabilizer for positioning said trial lens on a surface of a cornea of the wearer of said trial lens in a circumferential direction of said trial lens.

5. The trial lens according to claim 1, wherein said lens surface of said trial lens includes a concave surface which is formed in a substantially spherical shape to match with a surface profile of a cornea of the wearer of said trial lens.

6. The trial lens according to claim 1, wherein said lens surface of said trial lens includes a convex surface which includes any one of a plurality of spherical surfaces and a toric surface.

7. The trial lens according to claim 1, wherein said index may be formed in said lens surface by any one of carving with a laser, cutting, drilling, and grind-etching.

8. The trial lens according to claim 7, wherein said index formed in said lens surface is preferably provided on a convex side of said trial lens to any one of reduce and prevent adverse effects to a cornea of a wearer.

9. The trial lens according to claim 8, wherein one of said adverse effects is the wearer feeling said index while wearing said trial lens.

10. The trial lens according to claim 1, wherein said index may be formed on said lens surface by being printed with a dye.

11. The trial lens according to claim 1, wherein said index is any one of orthogonal axes, a lattice-shaped grid, and radial axes.

12. The trial lens according to claim 11, wherein said orthogonal axes include a horizontal X-axis and a vertical Y-axis, said X- and Y-axes having a scale for representing orthogonal coordinates.

13. The trial lens according to claim 11, wherein said lattice-shaped grid includes a plurality of horizontal and vertical intersecting lines.

14. The trial lens according to claim 11, wherein said radial axes include a plurality of concentric circles about an origin and a plurality of radial lines extending from said origin for representing any one of oblique and polar coordinates.

15. A method for measuring a stable position of a contact lens on a cornea of a wearer by using a trial lens of a contact lens type to be worn by the wearer, the contact lens having a lens surface in an optical area formed so as to include any one of a plurality of spherical surfaces and a toric surface, said method comprising the steps of:

using said trial lens having a lens surface and an index, wherein said lens surface is in a central portion, said central portion of said trial lens substantially corresponding to the optical area of the contact lens, wherein said index is any one of formed in and on said lens surface of said central portion of said trial lens so that said index may provide a reference to identify a certain point on said lens surface of said central portion of said trial lens for fitting the wearer with the contact lens which is optimal according to measured values using said index of said trial lens;

putting said trial lens in a stable position on a cornea of a wearer; and measuring a relative position of said trial lens with respect to a pupil by said index provided on said trial lens to indirectly identify a stable position of said contact lens.

16. A method for determining a relative position of an optical center of a contact lens with respect of a geometric center of said contact lens, said contact lens having a lens surface in an optical area formed so as to include any one of a plurality of spherical surfaces and a toric surface, said method comprising the steps of:

using a trial lens having a lens surface and an index, wherein said lens surface is in a central portion thereof, said central portion of said trial lens substantially corresponding to the optical area of the contact lens, and wherein said index is any one of formed in and on said lens surface of said central portion of said trial lens to be permanent and non-removable so that said index may provide a reference to identify a certain point on said lens surface of said central portion of said trial lens for fitting the wearer with the contact lens which is optimal according to measured values using said index of said trial lens;

putting said trial lens on a cornea of a wearer;

measuring a relative position of a geometric center of the trial lens with respect to a pupil of the wearer by an index provided on said trial lens; and determining a relative position of said optical center of said contact lens with respect to a geometric center of said contact lens based on a measured value.

17. The method according to claim 16, further comprising measuring a diameter of the pupil by said index when measuring said relative position of said geometric center of said trial lens with respect to the pupil of the wearer by said index provided on said trial lens; and determining a lens surface profile in an optical area of said contact lens based on a measured value indicative of the diameter of the pupil.

* * * * *